(12) United States Patent
Schuster et al.

(10) Patent No.: US 6,363,053 B1
(45) Date of Patent: Mar. 26, 2002

(54) METHOD AND APPARATUS FOR MEASUREMENT-BASED CONFORMANCE TESTING OF SERVICE LEVEL AGREEMENTS IN NETWORKS

(75) Inventors: Guido M. Schuster, Des Plaines; Michael S. Borella, Naperville; Jacek A. Grabiec, Chicago; Ikhlaq S. Sidhu, Vernon Hills, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/246,606

(22) Filed: Feb. 8, 1999

(51) Int. Cl.[7] .............................................. G01R 31/08
(52) U.S. Cl. ........................ 370/230; 370/400; 709/227
(58) Field of Search ................................ 370/229, 230, 370/232, 252, 233, 465, 477, 254, 400, 409, 401, 259, 351; 709/227

(56) References Cited

U.S. PATENT DOCUMENTS 5,898,668 A * 4/1999 Schaffer ...................... 37/230
6,081,513 A * 6/2000 Roy ........................... 370/260
6,137,782 A * 10/2000 Sharon ....................... 370/255

OTHER PUBLICATIONS

P. Almquist, Type of Service in the Internet Protocol Suite, RFC 1349, Jul., 1992.
S. Shenker et al., Specification of Guaranteed Quality of Service, RFC 2212, Jul., 1997.
A Primer on Internet and TCP/IP Tools and Utilites, RFC 2151, Jun., 1997.
E. Ellesson et al., A Proposal for the Format and Semantics of the TOS Byte and Traffic Class Byte in IPv4 and IPv6 Headers, Nov., 1997.
J. Richter, Flexibility in QoS Support, Sep. 19, 1997.
P. Ferguson et al., Quality of Service: *Delivering QoS on the Internet and in Corporate Networks*, John Wiley & Sons, Inc., 1998, pp. 1–51 and 71–82.

* cited by examiner

*Primary Examiner*—Douglas Olms
*Assistant Examiner*—Ricardo M. Pizarro
(74) *Attorney, Agent, or Firm*—McDonnell Boehnen Hulbert & Berghoff

(57) ABSTRACT

A method and apparatus for measurement-based conformance testing of service level agreements in networks. The method includes first collecting quality of service information from network traffic over a plurality of network nodes. Then, the collected quality of service information is compared to a plurality of specified quality of service levels. A plurality of possible virtual quality of service pathways through a plurality of network nodes is provided, based on the compared quality of service information. One embodiment of the method includes the additional step of creating a virtual connection using the compared quality of service information. In another embodiment of the method, the step of collecting quality of service information from network traffic over a plurality of network nodes includes first transmitting test traffic from a source to a destination over a plurality of network nodes. The transmitted test traffic is then received at the destination, and quality of service information is identified by comparing characteristics of the test traffic transmitted by the source to characteristics of the test traffic received by the destination.

12 Claims, 8 Drawing Sheets

METHOD AND APPARATUS FOR MEASUREMENT-BASED CONFORMANCE TESTING OF SERVICE LEVEL AGREEMENTS IN NETWORKS

FIELD OF INVENTION

This invention relates to communications networks. More specifically, it relates to a method and apparatus for testing conformance to service level agreements in networks.

BACKGROUND OF THE INVENTION

The Internet, a packet-switched network, currently operates substantially as a best effort network, providing a single class of service. In a single class of service network, packets transmitted between a source and destination are each treated as having equal priority. Network entities typically make no distinction between packets and thus all packets are of the same priority and subject to the same delivery latencies and delays. Therefore, there are few specified parameters and few guarantees that Internet traffic will be delivered to the target device. While this is probably an acceptable model for data communication, it may not be suitable to support multimedia applications. Multimedia applications have different needs than those required for data communication. While a main factor for data communication is throughput, the main factor for effective operation of multimedia applications is usually delay.

Therefore, next-generation remote access servers will likely need to explicitly support multiple classes of service (i.e., differentiated services) to provide support for multimedia applications and other real-time applications, such as Voice-over-IP, in which voice signals are digitized and packetized for transmission across an IP network. Differentiated services will likely operate on a packet-by-packet basis, and may include options to differentiate packet forwarding and routing based on pre-defined parameters, such as those relating to throughput, delay, jitter, and loss. The parameters will likely be administratively initiated and enforced on either a per-user or per-traffic-type basis.

One prior art method that has been used to implement a differentiated services scheme is to stamp each packet to establish the class of service to which the stamped packet belongs. The stamping of a packet may occur in many places in the network, such as the user's workstation, a first-hop router, a gateway, or a remote access server, for example.

Under the trend towards the use and support of differentiated services in packet-switched networks, some traffic streams are given higher priority than others at switches and routers, based on a service level agreement (SLA) between the sender of the stream and a network administrative entity (NAE), which may be an Internet service provider, for example. Currently, priority mechanisms are supported or proposed by Frame Relay, ATM, Token Ring, Ethernet, and Internet Protocol (IP) networks. The implementation of differentiated services allows for improved quality of service (QoS) to be realized in higher priority traffic. Quality of Service is discussed in *Quality of Service: Delivering QoS on the Internet and in Corporate Networks* by P. Ferguson and G. Huston, John Wiley & Sons, New York, 1998.

An SLA is an agreement between a user and a service provider that defines the nature of the service to be provided and the responsibilities of both parties. It is important for users to have responsibilities in a differentiated services scheme, otherwise all users may attempt to transmit all traffic at a high priority level, which would obliterate the benefits derived from having the scheme. To reduce the chance of all users trying to send traffic at a high priority level, a pricing or capacity allocation scheme will likely form the basis of these agreements. These schemes may be based on flat-rate, per-time, per-service, or per-usage charging, or some other method. Thus, a sender who requires a particular QoS will be able to procure an SLA with an NAE to provide a mapping to an appropriate discrete service level. The contract is likely to take on the following form: The sender agrees to transmit traffic within a particular set of parameters, such as mean bit-rate, maximum burst size, etc., and the NAE agrees to provide the requested QoS to the sender, as long as the sender's traffic remains within the parameters.

An SLA for a non-differentiated services scheme may denote a QoS characteristic that will be provided to the user, such as a throughput specification that will be provided across a virtual leased line, or maximum delay or packet loss specification that will be provided over an IP network.

As an example, a network user may have an SLA with an ISP (an NAE) specifying that the ISP will mark all of the user's packets with a particular per hop behavior. The per hop behavior could be based on the type of traffic generated, such as a per hop behavior stamp providing low delay for remote login applications or a providing high throughput for file transfers, for example. Given the per hop behavior, each router between the user and the destination (the traffic sink) will handle the user's packets in the particular proscribed manner. For example, a packet marked for low latency might be served before a packet marked for high throughput.

These QoS schemes may be an improvement over current best effort networks, however, at least two problems arise. First, an NAE may not be able to guarantee the QoS specified in the SLA. In particular, it is difficult to guarantee capacity to individual traffic flows in IP networks, even with a priority scheme in place, because the NAE may not be able to control the number of users connected at any particular time, and therefore cannot control the users cumulative demands on bandwidth. Secondly, the Internet consists of many independent NAEs. It is currently not possible for a single NAE to provide end-to-end QoS if the sender's traffic is traveling across multiple NAEs because a single NAE typically only has control over a small portion of the entire end-to-end network path.

Therefore, a QoS scheme may include contractual obligations between peer NAEs in addition to the obligations between senders and NAEs. Contractual obligations between peer NAEs are contained in an Inter-Provider SLA (IPS). Since each NAE may have several peer NAEs, it may be desirable to have several IPSs, wherein each IPS contains contractual obligations between adjacent NAEs. Alternative IPS arrangements are also possible, such as several NAEs agreeing to abide by the terms of a single SLA.

Once a differential QoS scheme is implemented among the NAEs, a user may select a class of service that supports an application. However, the user may not know which class of service satisfies the QoS demands of the application. If the user overcompensates by selecting a higher priority class of service, the user may incur unnecessary costs. Additionally, the user may not even know if the QoS contractual obligations regarding the different classes of services are being complied with by the NAEs.

In order for the QoS contractual obligations underlying SLAs and IPSs to be useful, they must be enforceable. To be enforceable, it must be determined whether the contractual obligations are being complied with. Needed is a method and/or apparatus to measure compliance of an NAE to an IPS or SLA.

Also needed is a method and/or apparatus to allow a user to measure the QoS for different classes of service. If a user has knowledge regarding the QoS characteristics for each class of service, the user may then select the least costly service level satisfying the QoS requirements for a particular application.

SUMMARY OF THE INVENTION

In view of the above, a method for conformance testing of service level agreements in networks is provided. The method comprises the steps of collecting quality of service information from network traffic over a plurality of network nodes, comparing the collected quality of service information to a plurality of specified quality of service levels, and providing a plurality of possible virtual quality of service pathways through a plurality of network nodes based on the compared quality of service information.

One embodiment of the method includes the additional step of creating a virtual connection using the compared quality of service information.

In another embodiment of the method, the step of collecting quality of service information from network traffic over a plurality of network nodes includes transmitting test traffic from a source to a destination over a plurality of network nodes, receiving the transmitted test traffic at the destination, and identifying quality of service information by comparing characteristics of the test traffic transmitted by the source to characteristics of the test traffic received by the destination.

In yet another embodiment of the method, the step of collecting quality of service information from network traffic over a plurality of network nodes includes transmitting test traffic from a source port to an echo port over a first plurality of network nodes. The echo port then transmits echo traffic back to the source port over a second plurality of network nodes, wherein the echo traffic corresponds to the test traffic. The source port receives the echo traffic and identifies quality of service information by comparing characteristics of the test traffic to characteristics of the echo traffic.

In still another embodiment of the method for conformance testing of service level agreements in networks, a first network device initiates a connection request for a second network device. The connection request is received on a third network device, wherein the connection request includes specified quality of service characteristics. A virtual data path between the third network device and the second network device is dynamically determined over a plurality of network devices, wherein the virtual data path includes the specified quality of service characteristics. The virtual connection is then created over the virtual data path between the first network device and the second network device, wherein the virtual connection includes the specified quality of service characteristics. The step of dynamically determining a data path may include the additional steps of dynamically collecting quality of service characteristics from the plurality of network devices between the first network device and the second network device, and comparing the collected quality of service characteristics to the specified quality of service characteristics. Furthermore, the additional step of generating a report indicative of a level of conformance between the collected quality of service characteristics and the specified quality of service characteristics may be included in one embodiment.

In accordance with a second aspect of the invention, a quality of service monitor for evaluating conformance by a network entity to a service level agreement is provided. The quality of service monitor includes a packet sniffer operatively connected to a network. A quality of service identification block is operatively connected to the packet sniffer. A comparator communicates with the quality of service identification block to compare the measured quality of service characteristics with the specified quality of service characteristics, thereby determining conformance to the service level agreement.

In accordance with a third aspect of the invention, a machine-readable storage medium contains a set of instructions for causing a general purpose computer to determine whether a ToS byte has been altered. The general purpose computer is connected to a network. The set of instructions cause the general purpose computer to transmit a first IP header from a first network device to a second network device. The first IP header includes a first ToS byte set to a first ToS value, which may be used to prioritize traffic on the network. Next, a second IP header is sent by the second network device in response to the second network device receiving the first IP header from the first network device. The second IP header is then received at the first network device from the second network device. The second IP header includes a second ToS byte set to a second ToS value. The general purpose computer then compares the first ToS value to the second ToS value to determine whether the first ToS byte has been altered.

In one embodiment of the machine-readable storage medium, the set of instructions cause the general purpose computer to perform the additional step of generating a report upon determining that the first ToS byte has been altered. The report may indicate a level of conformance by a network administrative entity to a service level agreement.

BRIEF DESCRIPTION OF THE DRAWINGS

These and other objects, advantages, and features of the invention will appear for purpose of illustration, but not of limitation, in connection with FIGS. 1–8, wherein like numbers refer to like parts throughout and in which.

DETAILED DESCRIPTION OF THE PRESENTLY PREFERRED EMBODIMENT

Figure 1:
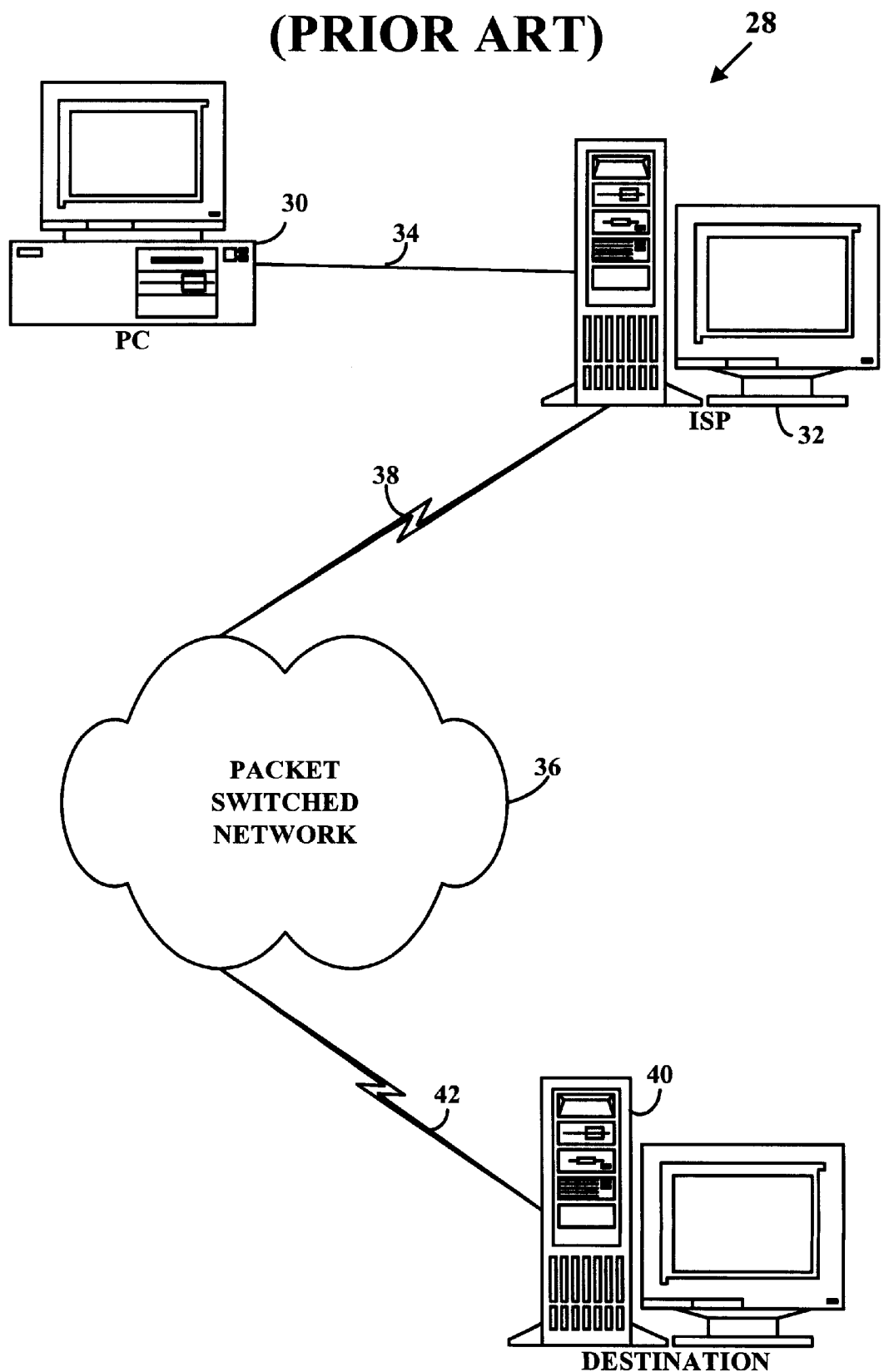
FIG. 1 is a block diagram illustrating an exemplary prior art network system.

FIG. 1 shows an exemplary prior art computer network 28. A Personal Computer (PC) 30 is connected to an ISP 32 across a communication line 34. The computer network 28 further includes a packet-switched network 36, such as the Internet, to which ISP 32 is connected by a virtual connection 38. A DESTINATION 40, which in the preferred embodiment is a computer or other network device, is connected to the packet switched network 36 by a second virtual connection 42.

The PC 30 may be operated by a user to provide the user with access to the rest of the network 28. The user of PC 30 receives access to the rest of the network by obtaining a service contract from a service provider, such as the ISP 32.

In a preferred embodiment, communication line 34 is a shared virtual leased line that is leased from the ISP 32. For example, the user of PC 30 may be an individual, home office, or small office user, who purchases a guaranteed service contract, wherein the contract specifies that 64 Kbps will be realized over a virtual leased line. In such an arrangement, the communication line 34 is a shared medium, such as a Local Area Network (LAN) or a cable plant. In a cable plant setup, the user PC 30 would be connected to a Cable Modem (CM), and a cable plant would serve as ISP 32. Alternatively, the cable plant could be located between PC 30 and ISP 32. Since communication line 34 is supposed to provide, by contract, a guaranteed service, such as the 64 Kbps virtual leased line described above, it may be desirable for the user of PC 30 to be able to determine whether or not the user is actually receiving the 64 Kbps of capacity.

Figure 2:
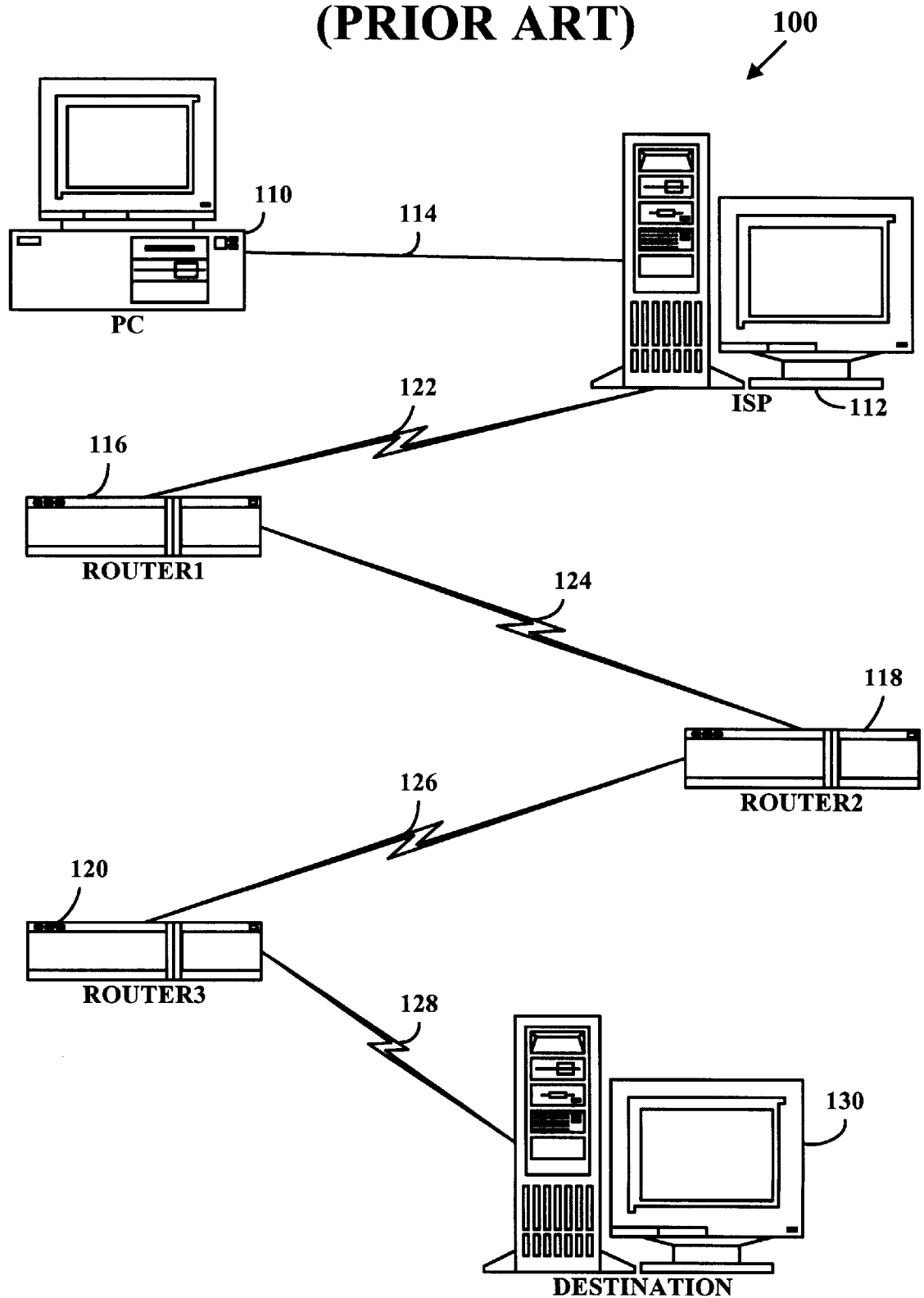
FIG. 2 is a block diagram illustrating an exemplary virtual connection pathway.

FIG. 2 shows a representation of a prior art end-to-end virtual connection 100 in a computer network similar to the computer network 28 in FIG. 1. PC 110, ISP 112, communication line 114, and DESTINATION 130 correspond to PC 30, ISP 32, communication line 34, and DESTINATION 40 in FIG. 1. Packet-switched network 36 in FIG. 1 has been replaced by router1 116, router2 118, and router3 120 in FIG. 2. Only three routers are shown in this example. A typical packet switched network is likely to contain many more routers and other network devices.

The end-to-end virtual connection 100 is made up of virtual connection segments between network devices. For a packet generated by PC 110, a virtual pathway is determined for the packet. The choice of a pathway for the packet is based on a number of factors, such as the packet destination, the traffic on different virtual network pathways, and other factors.

To get the packet to the final destination, a router may use a routing table to determine the next network device to send the current packet. The routing table may be periodically updated by adjacent network devices. Such a dynamic routing table may be updated using one of several protocols, such as Border Gateway Protocol (BGP), Open Shortest Path First (OSPF), External Gateway Protocol (EGP), Internal Gateway Protocol (IGP), or Common InterDomain Routing (CIDR), for example. A simplified exemplary routing table is shown below in TABLE 1.

TABLE 1

| TO REACH NETWORK: | SEND PACKET TO: |
| --- | --- |
| 122.0.0.3 | 121.1.1.4 |
| 123.6.5.1 | 124.3.2.6 |
| 127.0.7.3 | 126.1.1.1 |
| 126.7.3.5 | 125.2.12.3 |
| 127.7.7.4 | 120.2.13.2 |
| ... | ... |

In TABLE 1, the first column contains a list of the destinations that may be accessed from a router in which a packet has arrived. Although the routing table shows fully defined numerical addresses, it is also possible to use wildcard addresses, in which only a portion of an address is specified in the router table, and all addresses having that common portion will be treated similarly by the router. The packet preferably contains a destination address field. The router locates the destination address within its routing table. For example, if the packet destination address field lists 127.0.7.3 as the destination address, column 1 of the routing table is searched for the address 127.0.7.3. The routing table shown in TABLE 1 contains the destination address 127.0.7.3 in the third row of the column labeled, "TO REACH NETWORK:." The second column, labeled "SEND PACKET TO:," provides information to the router about which pathway to send the packet. For the destination address 127.0.7.3, the routing table shown in TABLE 1 points to 126.1.1.1 as being the proper address to send the packet. A network device at address 126.1.1.1 will perform a similar procedure to forward the packet to the next router in the virtual connection to the destination. This process will continue until the packet reaches the destination.

The end-to-end virtual connection path shown in FIG. 2 was determined using a procedure similar to that described above in conjunction with TABLE 1. Therefore, ISP 102 routed a packet to ROUTER1 116, as is shown by virtual connection segment 122. ROUTER1 116 then routed the packet to ROUTER2 118, as is shown by a second virtual connection segment 124. ROUTER2 118 then routed the packet to ROUTER3 120, as is shown by virtual connection segment 126. Finally, ROUTER3 120 routed the packet to DESTINATION 130, as is shown by virtual connection segment 128. The end-to-end virtual connection is thus created between the following network nodes: PC 110, ISP 112, ROUTER1 116, ROUTER2 118, ROUTER3 120, and DESTINATION 130.

Many more network nodes could have been included within end-to-end virtual connection 100. Similarly, fewer network nodes could have been included. The number of network nodes included within the end-to-end virtual connection will depend on the number of total network nodes existing in the entire network, the locations of the various network nodes, and the routing protocols used by the various network devices.

The communication line 114 between the user of PC 110 and the ISP 112 may be the only consistent segment of end-to-end virtual connection 100 in the embodiment shown in FIG. 2. The other virtual connection segments 122, 124, 126, and 128 may differ for each packet. Similarly the user of PC 110 is typically only aware of the relationship between the user and ISP 112, and not between the user and other network devices on the network, such as ROUTER1, ROUTER2, AND ROUTER3. Therefore, if the user of PC 110 does not receive an acceptable transmission of information between PC 110 and DESTINATION 130, there may a tendency to cast blame on ISP 112, because ISP 112 is the direct provider of service to the user of PC 110. In actuality, however, it is not possible for one network entity, such as ISP 112, to be able to control a packet after it has been sent across the next segment of the virtual connection to a next network entity or device, such as a router. Therefore, to assure end-to-end quality of service across a network, the network devices must cooperate to satisfy criteria defined by the QoS system. For example, if ISP 112 and the user of PC 110 enter into a Service Level Agreement (SLA) stating that 64 Kbps of end-to-end throughput will be provided for bidirectional transmissions to and from PC 110, then ISP 112 may only be able to control a small portion of the total end-to-end virtual pathways taken by the transmitted packets. The other portions are controlled by other network devices.

One method for providing the end-to-end 64 Kbps of throughput specified in the SLA would be for the ISP 112 to secure agreements with every other network device so that traffic originating from or destined for PC 110 (or other prioritized devices) would only be sent across segments supporting higher throughputs. This may work for smaller packet-switched networks, but is probably not reasonable for larger networks such as the Internet.

For larger packet-switched networks, a more realistic method would be for each network entity to have an Inter-Provider SLA (IPS) with each adjacent network entity. A first network entity is adjacent to a second network entity if a packet is able to pass directly from the first network entity to the second network entity without going through a third network entity. The second column of the routing table shown in Table 1, labeled "SEND PACKET TO:" will typically contain the addresses of only the adjacent network devices for the router served by the router table.

Figure 3:
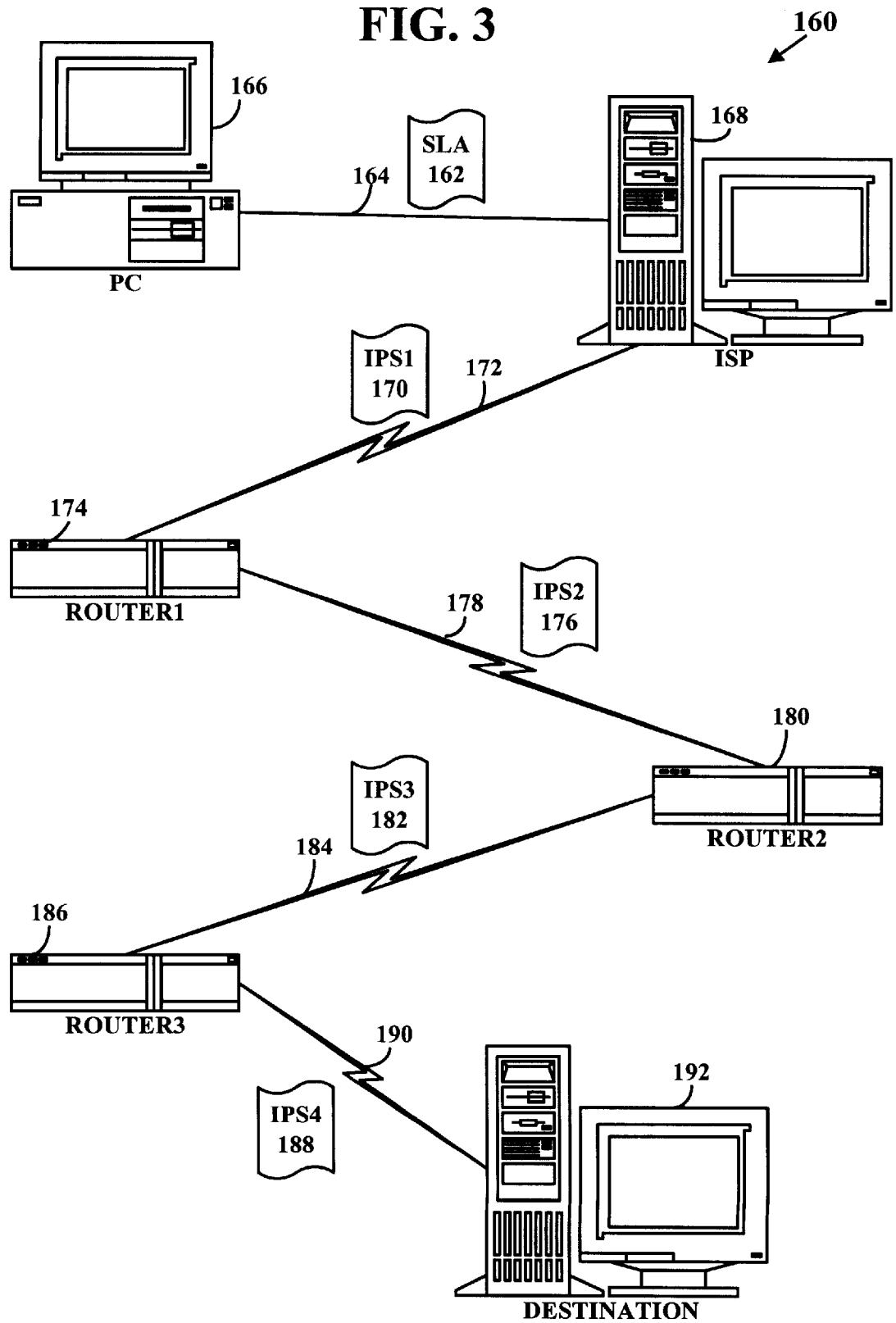
FIG. 3 is a block diagram of an virtual connection pathway in which service level agreements govern transmissions between network entities.

FIG. 3 shows an end-to-end virtual connection 160 supported by a system of service level agreements. An SLA governs transmissions across communication line 164 between PC 166 and ISP 168. IPS1 170 governs transmissions across virtual connection segment 172 between ISP 168 and ROUTER1 174. IPS2 176 governs transmissions across virtual connection segment 178 between ROUTER1 174 and ROUTER2 180. IPS3 182 governs transmissions across virtual connection segment 184 between ROUTER2 180 and ROUTER3 186. IPS4 188 governs transmissions across virtual connection segment 190 between ROUTER3 186 and DESTINATION 192. ISP 168, ROUTER1 174, ROUTER2 180, and ROUTER3 186 are each likely to have other IPSs with other adjacent routers and network devices as well, which are not shown in FIG. 3. The IPSs in a network could be created in advance, similar to conventional written contracts with a set term, or the IPSs could be created on a real time basis, which might take current network traffic conditions and cost considerations into account. Other IPS implementations are also possible.

If each network device has an IPS with each adjacent network device, a total network QoS system becomes realizable. Of course, one or more standard agreements pertaining to several, many, or all network devices could also be substituted for each individual IPS. Such a standard agreement may be in the form of a service level guarantee, where each packet has a service level or QoS specification associated with it, and the standard agreement specifies how each packet will be treated based on its associated service level or QoS specification.

Packet differentiation schemes have been developed (and new schemes are being developed) that allow packets to be tagged for differentiated treatment. For example, Internet Protocol Version Four (IPv4) specifies a Type of Service (ToS) byte in the header of an IP packet, which may be used to differentiate packets. Its format is defined as follows:

| Precedence (3) | Type of Service (4) | MBZ (1) |
| --- | --- | --- |

The 3-bit precedence field uses the values 000-111 to indicate the importance of the packet. For example, higher values may be assigned to be more important, and should be given priority over lower precedence packets.

The 4-bit type of service field has five defined values, as shown below in Table 2:

TABLE 2

| TOS VALUE | INTERPRETATION |
| --- | --- |
| 1000 | MINIMIZE DELAY |
| 0100 | MAXIMIZE THROUGHPUT |
| 0010 | MINIMIZE COST |
| 0000 | NORMAL |

The 1-bit MBZ (must be zero) field is unused. A drawback to this classic ToS architecture is that only one parameter from the set of delay, throughput, reliability and cost can be affected per packet. Thus, for example, a user cannot request low delay and high throughput simultaneously.

Recent Differential Services (DS) proposals have redefined the ToS byte fields, renaming the byte as the "DS byte." Currently, the interpretation and use of the DS byte is under review. A recent DS proposal redefines the DS byte fields as follows:

| Per-Hop Behavior (6) | Unused (2) |
| --- | --- |

The Per-Hop Behavior (PHB) field specifies a general effect that a router should have on the packet. For example, normal behavior is indicated with the value 000000, while expedited forwarding is indicated with the value 111000. Under current differentiation schemes, the actual implementation (in terms of an algorithm or mechanism) of this behavior, however, might be assigned to the administrative entity that is in charge of the router. A network-wide standard Inter Provider SLA (IPS) may specify the implementation so that consistency is achieved across the entire network, and a packet will be more likely to be routed according to the QoS specifications stated in the SLA between the user and the service provider.

For the user of PC 166 in FIG. 3 to be able to enforce SLA 162 with ISP 168, the user must first be able to determine whether SLA 162 is being complied with by the ISP 168. The duty to comply with service guarantees specified by SLA 162 is preferably an absolute duty on the part ISP 168, even if ISP does not control all the possible virtual pathways from PC 166 to any potential destinations. Under the framework of SLAs and IPSs described with reference to FIG. 3, if a network entity fails to abide by the terms of an IPS entered into with an adjacent network entity, that offending network entity is liable for the failure to comply. Therefore, if the ISP's failure to comply with an SLA is due to the failure of a network entity to comply with a binding IPS, then any consequential liability can be passed to the offending network entity so that the only the offending entity pays. This system promotes the use of compliance testing of IPSs by the individual network entities as well as compliance testing of the SLA by the end user.

In one embodiment, therefore, to collect quality of service information from network traffic over a plurality of network nodes or devices to determine SLA compliance, a user need not determine quality of service characteristics for each individual segment in an end-to-end virtual connection. Instead, quality of service characteristics for the overall end-to-end transmission may be tested.

According to a preferred embodiment, one manner of collecting quality of service information from network traffic over a plurality of network nodes involves transmitting test traffic from a source, such as PC 166 in FIG. 3, to a destination, such as DESTINATION 192, over a plurality of network nodes, such as ISP 168, ROUTER1 174, ROUTER2 180, and ROUTER3 186. The test traffic transmitted by the source (PC 166) is then received by the destination (DESTINATION 192). Next, quality of service information is identified for the received test traffic by comparing characteristics of the test traffic transmitted by the source (PC 166) to characteristics of the test traffic received by the destination (DESTINATION 192).

For example, PC 166 may be configured to transmit a stream of test traffic to DESTINATION 192 to determine whether ISP 168 is providing a throughput of 64 Kbps. If PC 166 transmits test traffic at a known throughput (such as 64 Kbps) to DESTINATION 192, the DESTINATION 192 can be tapped to determine the throughput actually realized. This may be accomplished by transmitting User Datagram Protocol (UDP) datagrams or Internet Control Message Protocol (ICMP) messages, for example. The User Datagram Protocol (UDP) is described in more detail in Request For Comments (RFC) 768, "User Datagram Protocol," J. Postel, August 1980. The Internet Control Message Protocol (ICMP) is described in more detail in Request For Comments (RFC) 792, "Internet Control Message Protocol," J. Postel, September 1981.

As another example, DESTINATION 192 in FIG. 3 may be an echo or unused port, which returns the received test traffic back to the source device, possibly using different virtual pathways than were traversed from the source to the destination. When test traffic is transmitted to an echo or unknown port, the test traffic is returned to the source from the echo and can be tapped at the source (PC 166) to determine what quality of service characteristics are being realized. Tapping communication lines is known by those having skill in the art, therefore, further detail thereof will not be given.

After the quality of service information has been collected, the next step in the method for determining whether the SLA is being complied with is to compare the collected quality of service information to the quality of service information specified in the SLA. For example, if by collecting quality of service characteristics it is determined that 50 Kbps of throughput are being realized, but the SLA specifies that 64 Kbps of throughput will be provided, then the user can determine that the SLA is not being complied with. As another example, if the SLA specified a plurality of quality of service levels with accompanying quality of service characteristics, the user could compare the measured quality of service characteristics to the service levels to determine whether the service levels were being provided as stated in the SLA. In the preferred embodiment, both the collection step and the comparison step are performed by a PC using a software program. Other implementations are also possible.

Figure 4:
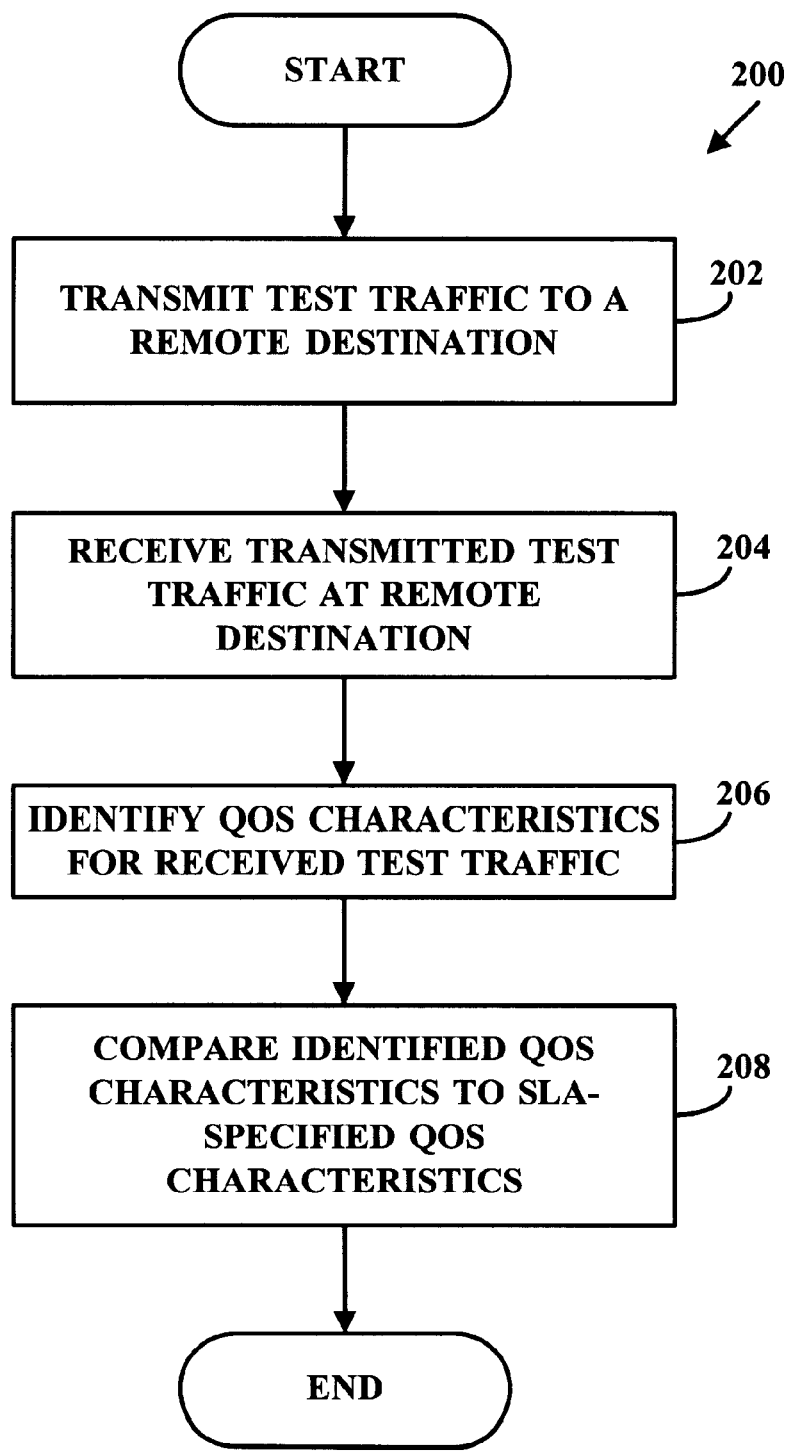
FIG. 4 is a flow diagram showing a method for conformance testing of a service level agreement using a remote destination.
Figure 5:
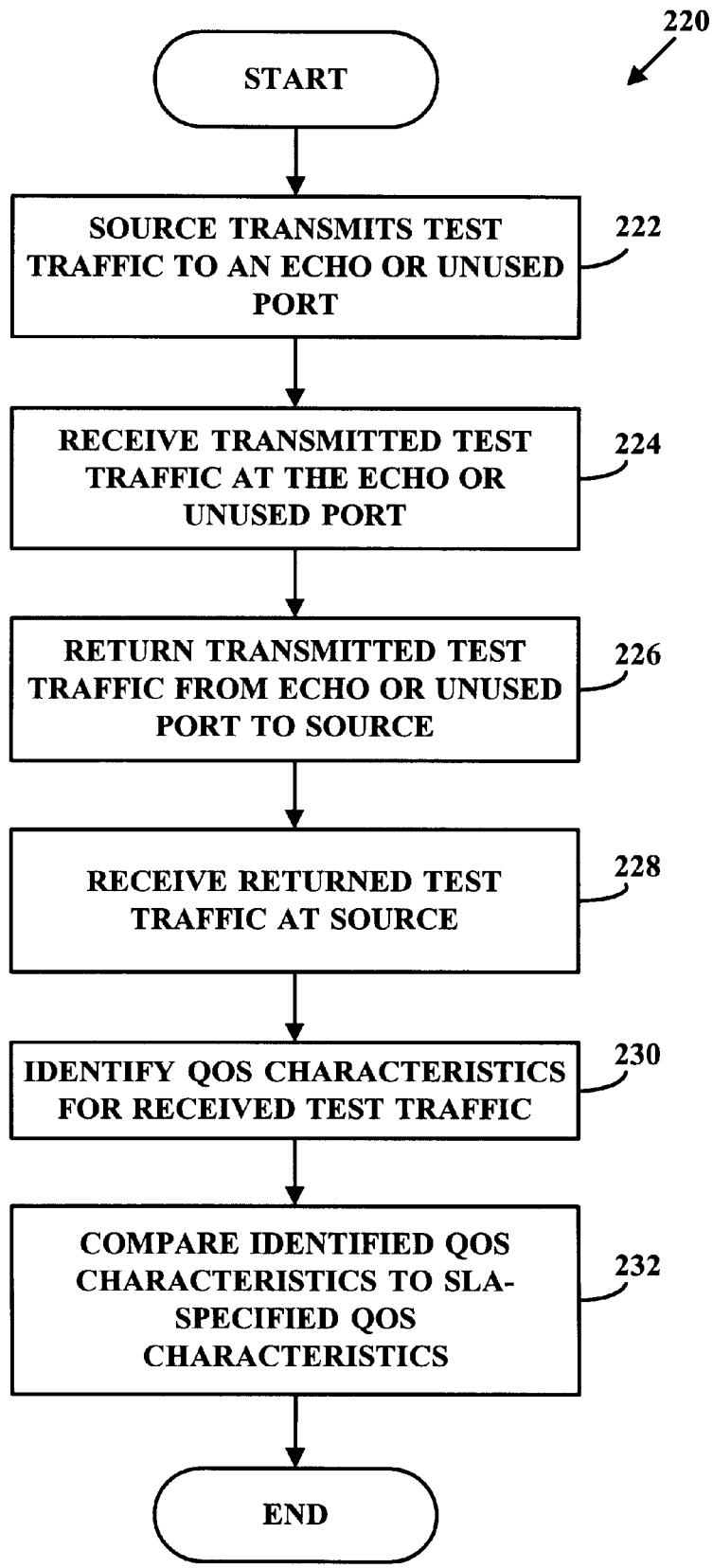
FIG. 5 is a flow diagram showing a method for conformance testing of a service level agreement using an echo or unused port.

FIGS. 4 and 5 are flowcharts describing the method illustrated above.

FIG. 4 shows a method 200 for conformance testing of an SLA, using a remote destination. First, test traffic is transmitted by a source to a remote destination, as shown in step 202. The source may be a PC, for example. The destination may be another PC located on the same network.

After the test traffic has been transmitted by the source and is routed or switched across the network, it is received by the remote destination, as shown by step 204. Next, the test traffic received at the remote destination is analyzed, and Quality of Service (QoS) characteristics for the received test traffic are identified, as shown in step 206. The QoS characteristics may consist of measurable attributes relating to the test traffic as it was sent from the source to the destination. For example, packet loss, throughput, jitter, and latency may be measured by comparing what traffic was transmitted to what traffic was received. A packet transmission count refers to the traffic that was transmitted, while a packet receipt count refers to the traffic that was received. The source can place a timestamp on the transmitted test traffic, and the destination can place a receipt timestamp on the received test traffic in order to calculate time-based measurements. Other methods of timekeeping may also be used. Given the information described above, computation of quality of service characteristics is known by those having skill in the art. In the preferred embodiment, the user of the source has access to both the source and the destination, in order to assist in identifying the quality of service characteristics. This may also assist in providing feedback to the user regarding the realized QoS characteristics.

After the QoS characteristics have been identified for the received test traffic, the identified characteristics are compared to QoS characteristics that are specified in a Service Level Agreement (SLA) governing the transmission, as shown in step 208. The specified QoS characteristics may dictate which QoS characteristics are identified at the destination, so that the comparisons may be made. Since the SLA may specify different QoS characteristics for differentiated service levels, it may be necessary to know what service level was being provided so that the comparisons may be properly made. By comparing the identified QoS characteristics to the specified QoS characteristics, the user can determine whether the SLA is being complied with.

FIG. 5 shows a method 220 for conformance testing of an SLA, by transmitting to an echo or unused port. First, test traffic is transmitted by a source to the echo or unused port, as shown in step 222. The source may be a PC, for example. The echo or unused port may be located on the same network. An echo port is a TCP or UDP port, usually numbered 7, which is configured on many Internet hosts to return any datagram sent to it. The echo port is bound to an executable program which receives all datagrams sent to the port, and returns a copy of such datagrams back to the sender. Echo ports are typically used for testing connectivity and data transmission integrity. An unused port, which is a port that does not have an executable program bound to it, may also be used for testing connectivity. If a packet with sent from a first host to an unused port at a second host, the second host will respond with an ICMP "port unreachable" packet, which may contain part of the original packet's IP header, but typically not the original packet's payload. After the test traffic has been transmitted by the source and is routed or switched across the network, it is received by the echo or unused port, as shown in step 224. The echo or unused port immediately causes the test traffic to be returned to the source through the network, as shown in step 226. The returned test traffic is then received by the source, as shown by step 228. The received test traffic is then analyzed, and Quality of Service (QoS) characteristics for the received test traffic are identified, as shown in step 230. The identification of QoS characteristics may be performed as described with reference to step 206 of FIG. 4.

After the QoS characteristics have been identified for the received test traffic, the identified characteristics are compared to QoS characteristics that are specified in a Service Level Agreement (SLA) governing the transmission, as shown in step 232. This step corresponds to step 208 in FIG. 4, and its accompanying description.

It may be desirable for the ISP to perform the method set forth above for the plurality of possible virtual quality of service pathways from the ISP to the destination, since the ISP 168 is liable to the user of PC 166 for failures to comply with the SLA 162. The ISP can then provide a plurality of possible virtual quality of service pathways through the plurality of network nodes based on the compared quality QoS of service information. Furthermore a virtual connection can be created across one or more of the plurality of possible virtual quality QoS of service pathways. Using this method, the ISP will be able to more accurately determine whether the quality QoS of service characteristics guaranteed to the user will be provided.

For the method described above, in which test traffic is transmitted, received test traffic is analyzed, and the quality of service characteristics are compared to characteristics specified in an SLA, it may be desirable for a clock at the transmitting device to be synchronized with a clock at the receiving and analyzing device. This will most likely be the case when time-based characteristics are being analyzed to determine SLA conformance. Examples of time-based characteristics are throughput, jitter, latency or delay, and any other quantities that may be measured and compared over a time interval. Clock synchronization may be implemented by synchronizing to a common time source, such as a Global Positioning System (GPS) clock, for example. A timestamp clock or other timestamp device may be used to accurately record the time of transmission and receipt. If a packet transmission count is taken at the source and a packet receipt count is taken at the destination (or source if the traffic is returned from an echo or unknown port), then by including timestamps at transmission and reception, time-based measurements can be made and compared to quality of service characteristics specified in an SLA.

The above method may be implemented using software, a combination of software and hardware, or hardware, for example. A preferred method of implementation would include hardware which performs the timestamping of received packets by the use of a signal from a highly-accurate clock source, while the remainder of the QoS testing would occur in software.

Figure 6:
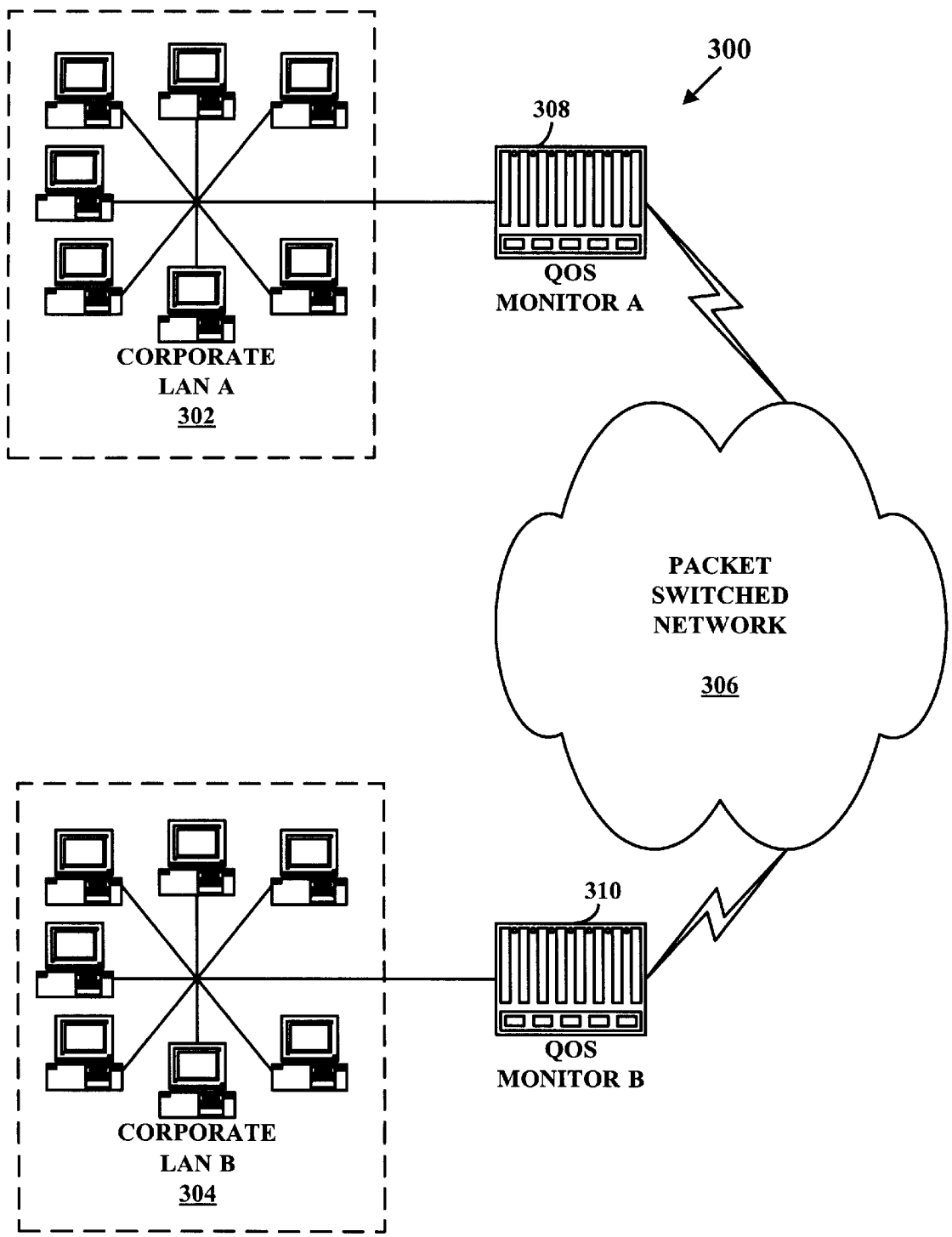
FIG. 6 is a block diagram illustrating a preferred embodiment of the invention in a virtual private network connecting two LANs.

FIG. 6 illustrates another example of a preferred embodiment of the present invention. A virtual private network (VPN) 300 connects two corporate Local Area Networks (LANs), corporate LAN A, 302, and corporate LAN B, 304, through Quality of Service (QoS) monitor A, 302, and QoS monitor B, 310, across a packet-switched network 306 administered by a service provider. In the preferred embodiment, corporate LAN A, 302, and corporate LAN B, 304, are administered by the same corporation or the same administrative entity.

A virtual private network (VPN) such as VPN 300 is a private data network that makes use of a public or shared telecommunication infrastructure, maintaining privacy through the use of a tunneling protocol and security procedures. The users of a VPN will encrypt data before sending it through the public network and decrypt it at the receiving end. Similar to the examples described with reference to FIG. 3, there may be an agreement between the user of VPN 300 and the service provider guaranteeing specified quality of service characteristics across the VPN. Such an agreement may be a Service Level Agreement (SLA). An exemplary clause in an SLA governing the service provider and the user of VPN 300 might state that the network traffic on the VPN will be delivered with no more than 40 milliseconds of delay, and no more than 1% packet loss. To test conformance to the SLA, the corporation can periodically perform test packet transmissions from one of the corporate LANs, and then use packet sniffers to detect and analyze the test packets transmissions as they are received at the other corporate LAN. A packet sniffer generally comprises software, hardware, or a combination of hardware and software. A preferred method of implementation would include hardware which performs the timestamping of received packets by use of a signal from a highly-accurate clock source, while the remainder of the QoS testing would occur in software. For network 300, the packet sniffers preferably operate in conjunction with proxy server A, 308, and proxy server B, 310, to examine the packets received at the proxy servers. It will be appreciated that the proxy servers may be implemented at part of a network firewall. Loss occurring across VPN 300 can be measured by comparing the number of packets received to the number of packets originally transmitted. If the originating site is clock-synchronized with the terminating site, for example, via GPS, then end-to-end delay can be determined by placing a timestamp in each transmitted packet. The determination of the end-to-end delay is an example of identifying QoS characteristics for VPN 300.

According to the conformance testing method, after QoS characteristics have been identified, they are compared to QoS characteristics specified in the SLA governing transmissions across VPN 300. This comparison allows the corporation to determine whether the SLA is being complied with by the service provider. As a further step in the conformance testing method, upon performing the comparison step, a report indicating the level of conformance to the SLA may be generated. For example, the report may indicate a percentage by which an observed and identified QoS characteristic deviated from the QoS characteristic as specified in the SLA. As another example, periods of noncompliance may be cumulatively measured to give an estimate of a percentage compliance time for a billing period. The report could be used as a basis for reduced billing as a result of the noncompliance by the service provider.

Figure 7:
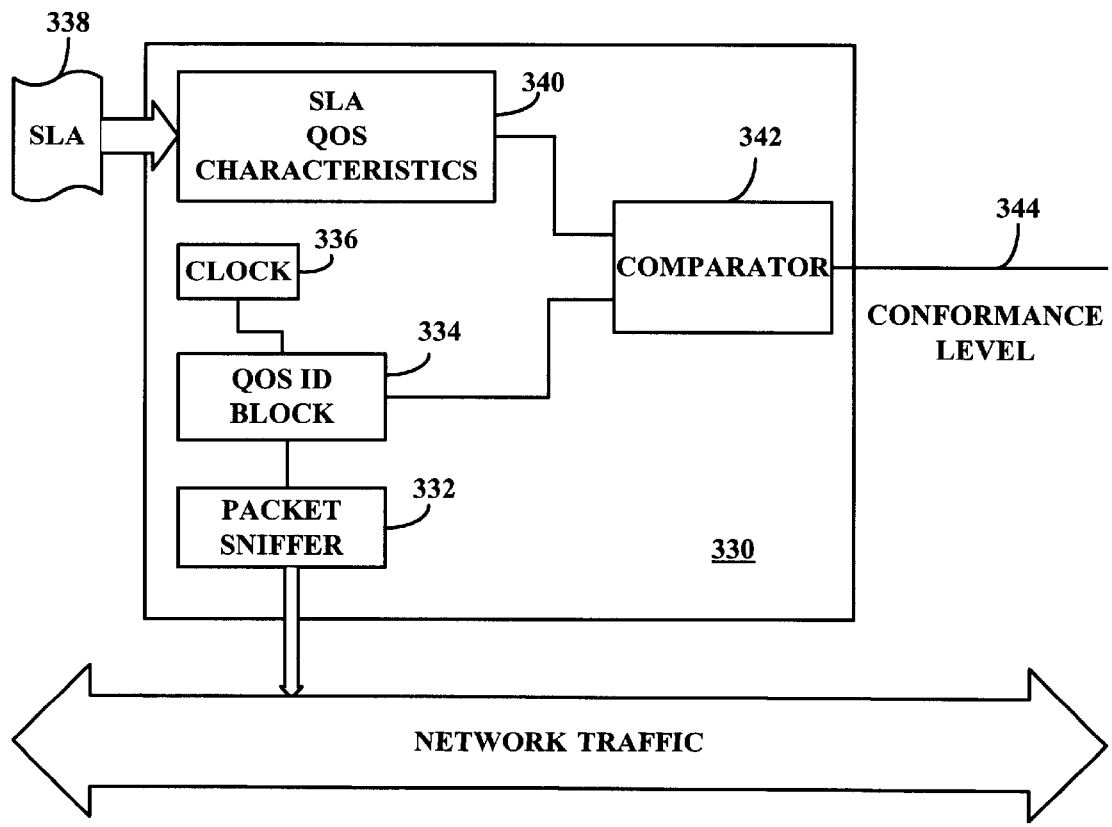
FIG. 7 is a block diagram illustrating a preferred embodiment of a quality of service monitor according to the present invention.

FIG. 7 is a block diagram illustrating a preferred embodiment for a QoS monitor 330, similar to QoS Monitor A, 308, or QoS Monitor B, 310, in FIG. 6. QoS monitor 330 includes a packet sniffer 332 that extracts test packets that have been injected into a network, such as a VPN, by a network entity, such as a proxy server. QoS identification block 334 then examines the extracted test packets and measured QoS characteristics are identified. A clock 336 may be included for identification of QoS characteristics having a time component. The identification of QoS characteristics may be accomplished as was described with reference to FIGS. 3–6.

Quantifiable QoS characteristics from an SLA 338 governing the network are generated and stored in an SLA QoS characteristics block 340, which may comprise random access memory (RAM), a magnetic storage unit, or an optical storage device, for example. These specified QoS characteristics may be static or they may be modified periodically, depending on the particular governing SLA. A comparator 342 receives the specified QoS characteristics from the SLA QoS characteristics block 340 and the measured QoS characteristics from the QoS ID block 334. The measured QoS characteristics are compared to the specified QoS characteristics, and an output 344 may be generated indicating conformance to the service level agreement. As stated above with reference to FIG. 6, the conformance output 344 may be in the form of a report that indicates a percentage by which a measured QoS characteristic deviates from the QoS characteristic as specified in the SLA 338. As another example, periods of noncompliance may be cumulatively measured to give an estimate of a percentage compliance time for a billing period. The report could be used as a basis for reduced billing as a result of the noncompliance by the service provider of the network.

Figure 8:
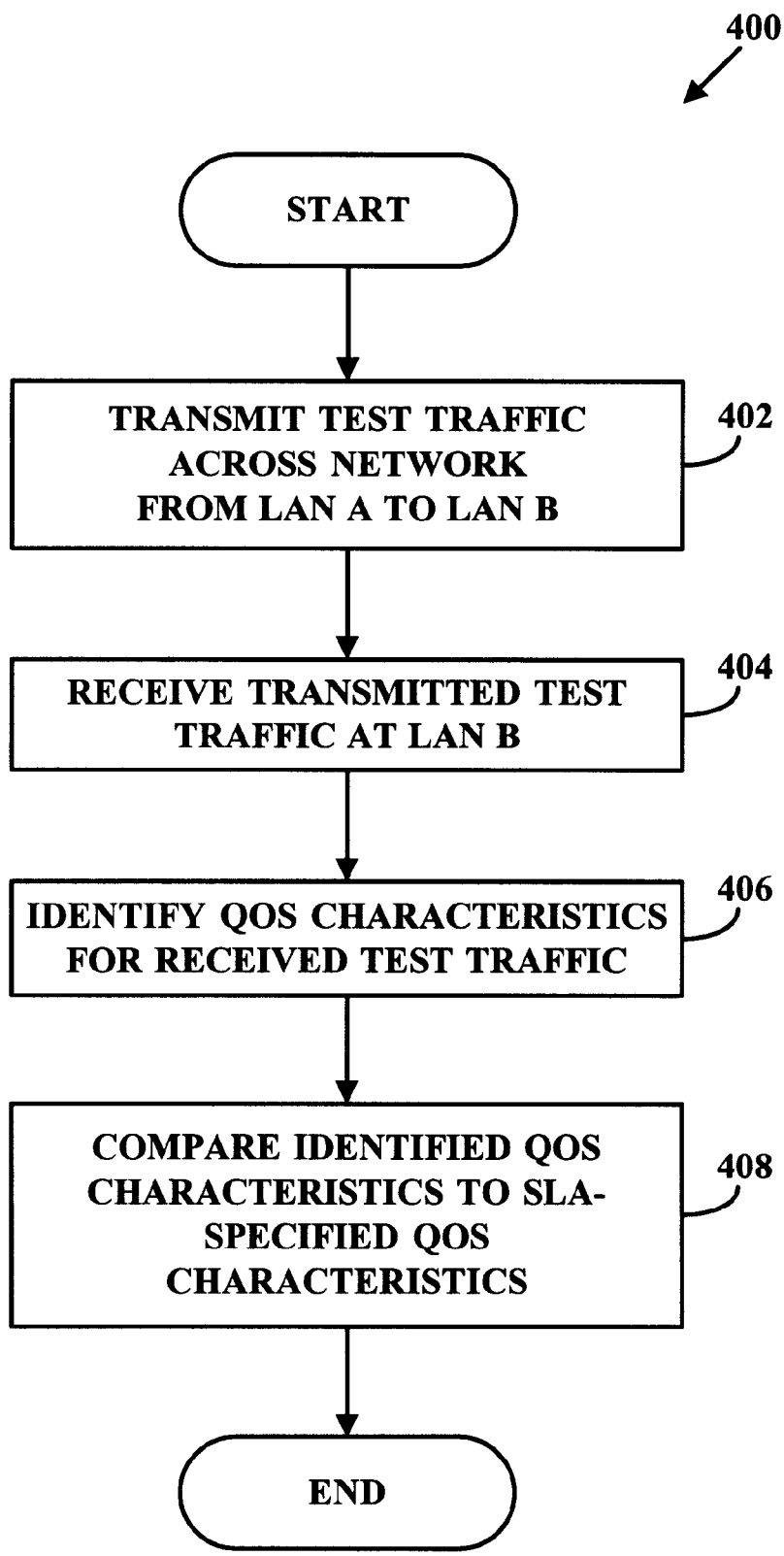
FIG. 8 is a flow diagram showing a method for conformance testing of a service level agreement governing a virtual private network connecting two LANs.

FIG. 8 shows a method 400 for conformance testing of an SLA governing a VPN connecting two LANs. First, one of the LANs transmits test traffic over the VPN to the second LAN, as shown in step 402. The test traffic propagates through the VPN and is received at the second LAN, as shown by step 404. A packet sniffer may be used to identify the transmitted test traffic. The transmitted test traffic may be identified by a particular IP address/port combination. Next, the test traffic is analyzed, and QoS characteristics are identified, as shown in step 406. The QoS characteristics may consist of measurable attributes relating to the test traffic as it was sent from the first LAN to the second LAN. For example, packet loss, throughput, jitter, and latency may be measured by comparing the traffic that was transmitted to the traffic that was received. The first LAN can place a timestamp on the transmitted test traffic, and the second LAN can place a receipt timestamp on the received test traffic in order to calculate time-based measurements. Other methods of timekeeping may also be used. After the QoS characteristics have been identified for the test traffic, the identified QoS characteristics are compared to QoS characteristics specified by the SLA, as shown in step 408.

An SLA may specify that different levels of service will be provided, each resulting in different QoS characteristics for the underlying data transmission. The user may have several methods available for signaling which service level should be used for a data transmission. For example, in MultiProtocol Label Switching (MPLS), packets are tunneled by wrapping them in a header that contains a label. The label carries forwarding and resource reservation information, so that Label Switching Routers (LSRs) may construct a Label Switched Path (LSP). Another method is by stamping the ToS byte in an IP header with a certain value indicating what priority or quality of service the packet should be given by network devices. The ToS byte was described in further detail with reference to FIG. 3.

If a ToS byte stamping is the method for specifying the service level, then the SLA may have a clause stating that once the ToS byte has been stamped by the user, it will not be modified thereafter. Modification of the ToS byte might result in the specified service level not being provided. Therefore, the ToS byte value may be included as one of the QoS characteristics measured as part of the present invention.

For example, a user may purchase a virtual leased line from an ISP, with a governing SLA allowing the user to stamp packets with an IP ToS byte such that three levels of service are provided, such as gold, silver, and bronze. In this example, the user may be charged based on the number of packets of each priority. In order to ensure that the ToS byte is not being modified, the user may use a program that allows him to modify the IP ToS byte of several test packets. By transmitting a small number of these special test packets, the user may determine whether the ToS byte has been modified. The approximate round-trip latency and loss rate for each level of service may also be determined by monitoring the time component and recording packet receipt statistics.

This preferred embodiment may also be useful for determining which service level provides the best price/performance tradeoff for the user's needs. For example, if the user would like to play an interactive game with players located across the network, he may want to receive less than 150 millisecond round trip latency and packet loss rates under 5%. By modifying the ToS byte and monitoring the QoS characteristics, the user is able to choose a service level, even if some of the QoS characteristics are not specified in the SLA. Source code for this preferred embodiment is listed below. The program may be implemented as a set of instructions contained on a machine-readable medium, such as a floppy diskette, a hard-drive disk, an optical storage disc, or in memory, for example. A general purpose computer having an operating system and having a connection to a network may be used to execute the instructions. The program is a client/server application in which the client transmits a raw IP header with the ToS byte set to a user-defined value. The server reads the ToS byte from the packet and responds back to the client with its own IP header, again with the ToS byte set to a second (possibly identical) user-defined value. The client responds to the source PC and the server corresponds to the destination described with reference to FIGS. 1–5. Both ToS bytes are included as payload in the server-to-client packet. If a router on either the client-to-server path or the server-to-client return path modifies the ToS byte, the user of the client will be to detect the modification by comparing the measured QoS characteristics (the modified ToS byte value) to the specified QoS characteristics (the specified ToS byte value), in accordance with the method of the present invention. One limitation with this example is that a router could change the payload data as well, which would skew the comparison step, but such a processor-intensive scheme is probably not realistic in a router.

The program is written in the "C" computer language, and utilizes public domain header files and "C" programming libraries, all of which are known by those having skill in the art. The required header files are listed at the beginning of each "C" source code file. The libraries that this program must be linked with are the standard C library (known to those having skill in the art as "libc") and the socket libraries (known to those having skill in the art as "libsocket" and "libnsl").

Furthermore, as listed below, the program is designed to run on a version of the UNIX operating system known as "Linux," utilizing the Debian 2.0 distribution and package management system. However, this program may be executed on a plurality of UNIX and Microsoft Windows platforms with minor modifications.

The program is operated by the user as follows:

1. The code is compiled on a source host and a destination host.
2. The executable program "tospingd" is run on the destination host. The user may include a "–t" command line option with allows the user to indicate the decimal value of the IP TOS byte that the "tospingd" program will return. For example, a command line entry of "tospingd –t 128" will cause "tospingd" to always return an IP TOS byte value of 128. The default IP TOS value that will be returned is 255.
3. The executable program "tosping" is run on the source host. The user may include a "–t" command line option which allows the user to indicate the decimal value of the IP TOS byte that the "tosping" program will transmit. For example, a command line entry of "tosping –t 128 149.112.240.10" will cause "tosping" to transmit a packet with an IP TOS byte value of 128 to destination host 149.112.240.10. The default IP TOS value that will be transmitted is 255.

4. The "tosping" program will display the value of the IP TOS byte that it transmitted as well as the value of the IP TOS byte that the destination "tospingd" program received. The user will be able to compare these values to determine whether or not the IP TOS byte of the transmitted packet was modified by a network or network component between the source host and the destination host.

It will be appreciated that the following program code can only be used to detect IP TOS byte modification. It does not perform all of the QoS tests that have been described above.

An operating environment for communication devices of the present invention may include a processing system with at least one high speed Central Processing Unit ("CPU") and a memory. In accordance with the practices of persons skilled in the art of computer programming, the present invention is described above with reference to acts and symbolic representations of operations that are performed by the processing system, unless indicated otherwise. Such acts and operations are referred to as being "computer-executed" or "CPU executed."

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile (e.g., Random Access Memory ("RAM")) or non-volatile (e.g., Read-Only Memory ("ROM")) mass storage system readable by the CPU.

Preferred and alternative embodiments of the present invention have been illustrated and described. It will be understood, however, that changes and modifications may be made to the invention without deviating from its true spirit and scope, as defined by the following claims.

Tosping.c
```
/*************************************************************************
** File: tosping.c
**
** TOSping client
**
*************************************************************************/ include <stdio.h>
include <sys/socket.h>
#include <arpa/inet.h>
#include <netinet/in.h>
#include <unistd.h>
#include <errno.h>
#include <signal.h>
#include <netdb.h>
#include "tosping.h"
#include "parse_cl.h"
#include "ip.h"

define HOSTNAME_SIZE 64 struct arg_t *my_args;    /* Command line arguments */
extern char version[];

/*---------------------------------------------------------------
 *
 * main()
 *
 *---------------------------------------------------------------
 */ int main(int argc, char *argv[])
{
  const int one = 1;
  int s, n;
  IPHdr iph;
  char hostname[HOSTNAME_SIZE];
  char buf[32];
  char *desthost;
  struct in_addr in;
  struct sockaddr_in sin;   /* an Internet endpoint address */
  int srv_rec_tos, srv_snt_tos;
  void syserr(char *,...);
  u_int32_t host2ip(char *);
  void alarm_handler(void);

/*
   * Announce who we are
   */ printf("%s v%s  3Com Advanced Technologies Research Center\n",
```

```
            argv[0], version);

/*
      * Parse command line
 5    */ my_args = parse_cl(argc, argv);
     if (my_args->optind <= argc-1)
       desthost = argv[my_args->optind];
10   else
       {
         usage(argv[0]);
         exit(1);
       }
15
     /*
      * Set up a raw socket so that we can specify the IP header of packets sent on it, then leave superuser mode
      */

20   s = socket(AF_INET, SOCK_RAW, IPPROTO_TOS);
     setuid(getuid());
     if (setsockopt(s, IPPROTO_IP, IP_HDRINCL, (const void *) &one,
                    sizeof(one)) < 0)
       syserr("Can't put raw socket into header-write mode");
25
     /*
      * Make the custom IP header
      */

30   iph.ip_hl = 5;
     iph.ip_v = 4;
     iph.ip_tos = my_args->t; /* read TOS byte from command line or default */
     iph.ip_len = htons(20);
     iph.ip_id = 0; /* tells kernel to create an ID field automatically */
35   iph.ip_off = 0;
     iph.ip_ttl = 255;
     iph.ip_p = IPPROTO_TOS;
     iph.ip_csum = 0; /* kernel should compute the checksum for us */

40   /*
      * Make this host's IP address the source IP address
      */ if (gethostname(hostname, HOSTNAME_SIZE) < 0)
45     syserr("can't get host name");
     iph.ip_src = host2ip(hostname);

/*
      * Copy the destination IP address from the command line, then set up data structure for connect,
50    * not worrying about port numbers
      */ iph.ip_dst = host2ip(desthost);
```

- 27 -

```
       sin.sin_addr.s_addr = (u_long) iph.ip_dst;
       sin.sin_family = AF_INET;

/*
 5      * Connect the socket to make reading and writing easier
        */ if (connect(s, (struct sockaddr *)&sin, sizeof(sin)) < 0)
          syserr("can't connect to %s", desthost);
10
       /*
        * Set up 5 second alarm timeout in case of lost packets or unreachable
        * hosts, because we can't count on getting ICMP messages on this socket.
        */
15
       signal(SIGALRM, (sighandler_t) alarm_handler);
       alarm(5);

/*
20      * Send the packet
        */ if (write(s, (char *) &iph, sizeof(iph)) < 0)
          syserr("can't write tosping packet");
25
       #ifdef DEBUG
       {
          struct in_addr addr1, addr2;

30        addr1.s_addr = iph.ip_src;
          addr2.s_addr = iph.ip_dst;
          printf("DEBUG: Sending a packet with TOS = %d from %s to %s\n",
                 iph.ip_tos, inet_ntoa(addr1), inet_ntoa(addr2));
       }
35     #endif printf("We sent TOS = %d... ", my_args->t);

/*
40      * read response from network then turn off alarm
        */ if ((n = read(s, buf, sizeof(buf))) < 0)
          syserr("read error");
45     alarm(0);

/*
        * get IP header from response packet
        */
50
       memcpy((char *) &iph, buf, sizeof(iph));

/*
```

```
         * get the TOS byte received and sent by the server
         */ in.s_addr = iph.ip_src;
  5     sscanf(&buf[sizeof(iph)], "%d:%d", &srv_rec_tos, &srv_snt_tos);
        printf("%s received TOS = %d\n", inet_ntoa(in), srv_rec_tos);
        printf("%s sent TOS = %d... ", inet_ntoa(in), srv_snt_tos);
        printf("We received TOS = %d\n", iph.ip_tos);

10     return 0;

}

15     /*-----------------------------------------------------------------
         *
         * host2ip()
         *
         * Convert a host address string in either domain name or dotted decimal
 20      * format to a 32-bit ip address in u_long format
         *
         *-----------------------------------------------------------------
         */
 25     u_int32_t host2ip(char *host)
        {
          u_int32_t ipaddr;
          struct hostent *phe;
          void syserr(char *,...);
 30
          /*
           * First try domain name format; if that doesn't work, try dotted decimal
           */

35       if ((phe = gethostbyname(host)) )
            memcpy((u_int32_t *) &ipaddr, phe->h_addr, phe->h_length);
          else
            if ((ipaddr = inet_addr(host)) == INADDR_NONE)
              syserr("can't get convert %s to IP address", host);
 40
          return (ipaddr);
        }

/*-----------------------------------------------------------------
 45      *
         * alarm_handler()
         *
         * Handler function for SIGALRM.  Does nothing but handle the interrupt
         *
 50      *-----------------------------------------------------------------
         */ void alarm_handler(void)
```

- 29 -

```
        {
        printf("No response\n");
        exit(0);
        } tosping.h
/************************************************************************
** File: tosping.h
**
** Global definitions
**
************************************************************************/ ifdef HAVE_CONFIG_H
include "config.h"
endif define IPPROTO_TOS 99
/* #define DEBUG 1 */ typedef void (*sighandler_t)(int);

parse_cl.h
/************************************************************************
**
** parse_cl.h
**
** Header file for command line parsing routines
**
** Automatically created by genparse v0.2.2
**
**
************************************************************************/ include <stdio.h> struct arg_t
{
  int t;
  int optind;
};

struct arg_t *parse_cl(int, char **);
void usage(char *);
void free_args(struct arg_t *);

/************************************************************************
**
** parse_cl.c
```

```
**
** Main command line parsing routines
**
** Automatically created by genparse v0.2.2
**
***************************************************************************/ include <stdio.h>
include <unistd.h>
#include <stdlib.h>
#include <string.h>
#include <getopt.h>
#include "parse_cl.h"

/*----------------------------------------------------------------
 *
 * usage()
 *
 *----------------------------------------------------------------
 */
void usage(char *exc)
{
  printf("usage: %s [ -t ]\n", exc);
  printf(" [ -t ] ");
  printf("[ --tosbyte ] ");
  printf("TOS byte value");
  printf("\n");

exit(1);
}

/*----------------------------------------------------------------
 *
 * free_args()
 *
 *----------------------------------------------------------------
 */
void free_args(struct arg_t *my_arg)
{
  free(my_arg);
} parse_cl.c
/*----------------------------------------------------------------
 *
 * parse_cl()
 *
 *----------------------------------------------------------------
 */
```

```
struct arg_t *parse_cl(int argc, char *argv[])
{
  extern char *optarg;
  extern int optind;
  int option_index = 0;
  char c;
  struct arg_t *my_arg;
  int errflg = 0;

static struct option long_options[] =
  {
    {"tosbyte", 1, 0, 't'},
    {0, 0, 0, 0}
  };

my_arg = (struct arg_t *) malloc (sizeof(struct arg_t));
  my_arg->t = 255;

while ((c = getopt_long(argc, argv, "t:", long_options, &option_index)) != EOF)
    {
      switch(c)
      {
        case 't':
          my_arg->t = atoi(optarg);
          if (my_arg->t < 1)
            {
              fprintf(stderr, "parameter range error: t must be >= 1\n");
              errflg ++;
            }
          if (my_arg->t > 255)
            {
              fprintf(stderr, "parameter range error: t must be <= 255\n");
              errflg ++;
            }
          break;

default:
          usage(argv[0]);

}
    } /* while */ if (errflg)
    usage(argv[0]);

if (!(my_arg))
    usage(argv[0]);

my_arg->optind = optind;
  return my_arg;
```

- 32 -

} error.c
/******************************************************************************
** File: error.c
**
** Comments: Try to gracefully handle errors.
**
******************************************************************************/

```
#include <stdio.h>
#include <stdarg.h>
#include <string.h>
include <errno.h> ifdef DHAVE_CONFIG_H
include "config.h"
endif ifndef errno
extern int errno;
#endif
```

/*---------------------------------------------------------------------
**
** Function: my_strerror()
**
** Comments: Use strerror() if this system supports it. Do it ourselves otherwise.
**
*/

```
char *my_strerror(int errnum)
{
#ifdef HAVE_STRERROR
    return (strerror(errnum));
#else
    extern int sys_nerr;
    static char ebuf[20];

if ((int) errnum < sys_nerr)
        return ((char *) sys_errlist[errnum]);
    (void) sprintf(ebuf, "Unknown error: %d", errnum);
    return(ebuf);
#endif
}
```

/*---------------------------------------------------------------------
**
** syserr()
**
** Use only when a system call fails. Not for general errors.

```
        **
        **--------------------------------------------------------------
        */

5      void syserr(char *fmt, ...)
        { va_list    args;
            char       *my_strerror(int);
10
            va_start(args,fmt);

fprintf(stderr,"ERROR: ");
            vfprintf(stderr, fmt, args);
15          fprintf(stderr," (%d ", errno);
            va_end(args);

fprintf(stderr, "%s)\n", my_strerror(errno));

20          exit(1);

}

/*--------------------------------------------------------------
25      **
        ** ftlerr()
        **
        ** General fatal error.
        **
30      **--------------------------------------------------------------
        */ void ftlerr(char *fmt, ...)
35      { va_list    args;

va_start(args,fmt);

40          fprintf(stderr,"ERROR: ");
            vfprintf(stderr, fmt, args);
            va_end(args);

45          fprintf(stderr, "\n");

exit(1);

}
50
```

We claim:

1. In a computer network, a method of testing a virtual connection for conformance to a service level agreement, comprising the following steps:

collecting quality of service information from network traffic over a plurality of network nodes, including:
transmitting test traffic from a source to a destination over said plurality of network nodes,
receiving the transmitted test traffic at the destination, and
identifying said quality of service information by comparing characteristics of the test traffic transmitted by the source to characteristics of the test traffic received by the destination, comparing the collected quality of service information to a plurality of specified quality of service levels; and providing a plurality of possible virtual quality of service pathways through said plurality of network nodes based on the compared quality of service information.

2. The method of claim 1, wherein characteristics of the test traffic transmitted by the source include a transmission timestamp and characteristics of the test traffic received by the destination include a receipt timestamp.

3. The method of claim 2, wherein the source is clock-synchronized with the destination.

4. The method of claim 1, wherein a GPS system is used to synchronize a source timestamp clock with a destination timestamp clock.

5. The method of claim 1, wherein characteristics of the test traffic transmitted by the source include a packet transmission count and characteristics of the test traffic received by the destination include a packet receipt count.

6. The method of claim 1 being executed by a computer readable medium having stored therein instructions for causing a processing unit to execute said method.

7. The method of claim 1 further comprising creating a virtual connection using the compared quality of service information.

8. In a computer network, a method of testing a virtual connection for conformance to a service level agreement, comprising the following steps:

collecting quality of service information from network traffic over a first plurality of network nodes, including:
transmitting test traffic from a source port to an echo port over a first plurality of network nodes, whereupon the echo port transmits echo traffic back to the source port over a second plurality of network nodes, and wherein the echo traffic corresponds to the test traffic,
receiving the echo traffic at the source port, and
identifying said quality of service information by comparing characteristics of the test traffic to characteristics of the echo traffic;

comparing the collected quality of service information to a plurality of specified quality of service levels; and providing a plurality of possible virtual quality of service pathways through said first plurality of network nodes based on the compared quality of service information.

9. The method of claim 8, wherein characteristics of the test traffic include a transmission timestamp stamped at the source port upon transmission of the test traffic and characteristics of the echo traffic include a receipt timestamp stamped at the source port upon receipt of the echo traffic.

10. The method of claim 8, wherein characteristics of the test traffic include a packet transmission count and characteristics of the echo traffic include a packet receipt count.

11. The method of claim 8 being executed by a computer readable medium having stored therein instructions for causing a processing unit to execute said method.

12. The method of claim 8 further comprising creating a virtual connection using the compared quality of service information.

* * * * *